Aug. 27, 1968  G. S. WING  3,398,628
STUD ASSEMBLY WITH TAPERED EXPANSION SEGMENT
Filed Dec. 28, 1966  2 Sheets-Sheet 1

INVENTOR.
GEORGE S. WING
BY
ATTORNEYS.

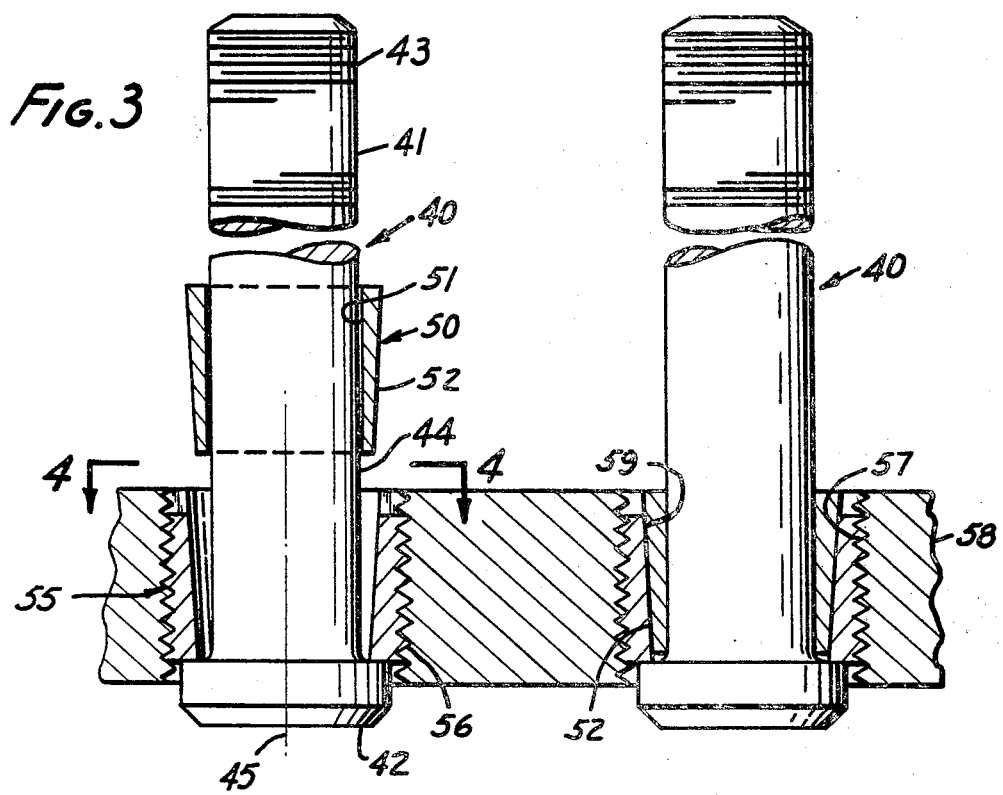
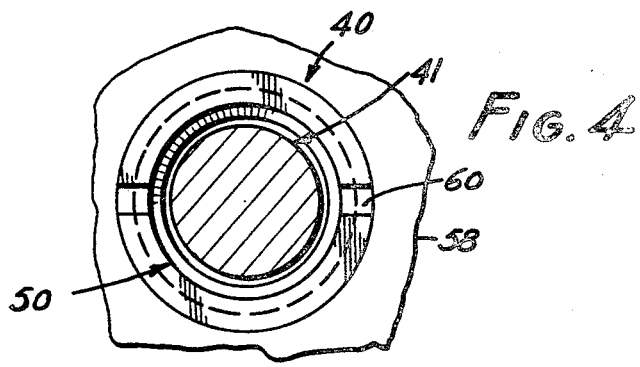

United States Patent Office 3,398,628
Patented Aug. 27, 1968

3,398,628
STUD ASSEMBLY WITH TAPERED
EXPANSION SEGMENT
George S. Wing, Torrance, Calif., assignor to Hi-Shear Corporation, Torrance, Calif., a corporation of California
Filed Dec. 28, 1966, Ser. No. 605,276
2 Claims. (Cl. 85—73)

ABSTRACT OF THE DISCLOSURE

A stud assembly which can be threaded into a tapped hole in a workpiece and then set by an axial pull. This stud assembly later can be removed by an axial push followed by an unthreading operation. It utilizes a sleeve with an external thread and an internal taper. A stud bolt carries and backs up a tapered expansion segment. Axial motion between the two tapers sets the sleeve tightly in the hole and tightly retains the stud bolt to the workpiece through the sleeve.

---

In one embodiment of the invention the expansion segment is integral with the stud bolt. In another embodiment of the invention the expansion segment is a separate ring surrounding the stud bolt.

A head is formed on the stud so disposed and arranged as to overhang the sleeve and limit the axial motion of the stud bolt and the expansion segment.

This invention relates to a stud bolt which can readily be engaged in a threaded hole in a workpiece and later be disengaged therefrom if desired. The conventional means for installing a stud is to tap a hole and then thread a stud into the hole. This device is sensitive to vibration and sometimes backs out of the hole. What is needed is a vibration-insensitive device which is insensitive to torque and which can be readily and inexpensively manufactured and installed.

A stud assembly according to this invention is adapted to be installed in a threaded hole in a workpiece, and is not sensitive to vibration. The assembly includes an externally threaded tubular sleeve which has an internal passage extending from end to end, with a smooth tapered inner wall extending for at least a portion of the length thereof. The external threads are adapted to engage the threads of the hole in the workpiece. The sleeve is made of solid material which is readily expansible by forces outwardly-directed against the tapered wall. A stud bolt inside the sleeve has a shank, a head adjacent to one end of the shank and threads spaced from the head. An expansion segment surrounds the bolt and is backed thereby. The expansion segment bears a tapered outer wall having some portions with lateral dimensions that are larger than some of those of the said inner wall. The tapered walls are tapered in the same direction and are thereby so proportioned as to interfere with each other when axially shifted toward one another such as by pulling the expansion segment into the inner wall, whereby the sleeve will be expanded into the wall of the threaded hole and the stud will project beyond the workpiece.

According to a feature of the invention, the shank is circularly cylindrical and the expansion segment is a ring with an inner diameter such that it slides on the shank. The thread on the stud bolt has a major diameter which is larger than the inner diameter of the ring, thereby retaining the sleeve and the ring on the shank.

The above and other features of this invention will be fully understood from the following detailed description and the accompanying drawings, in which:

FIG. 3 is a side elevation partly in cutaway cross-section showing the construction and installation of the presently preferred embodiment of the invention; and FIG. 4 is a cross-section taken at line 4—4 of FIG. 3.

Figure 1:
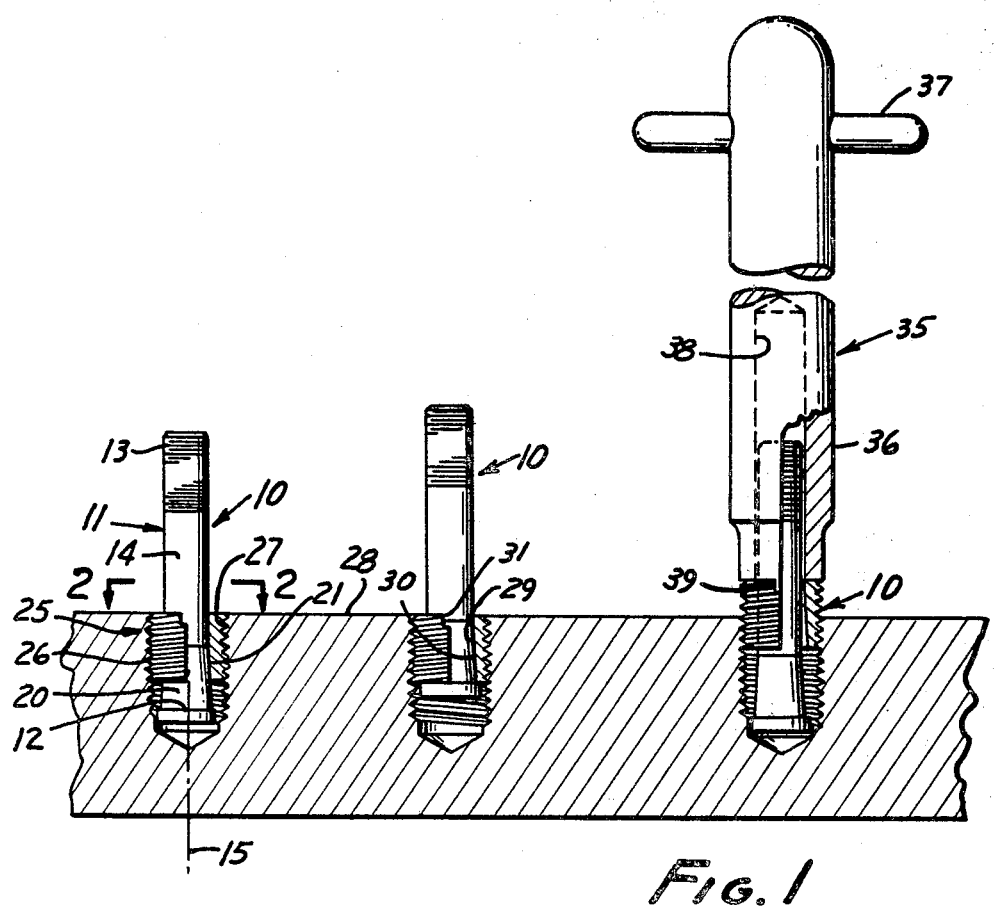
FIG. 1 is a side elevation partly in cutaway cross-section showing the construction and installation of one embodiment of the invention.
Figure 2:
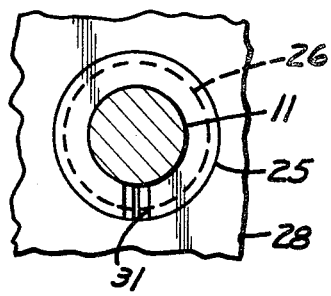
FIG. 2 is a cross-section taken at line 2—2 of FIG. 1.

In FIG. 1 there is shown a stud assembly 10 which includes a stud bolt 11 having a head 12 at one end thereof and an external thread 13 at the other end. The bolt also includes a cylindrical shank 14 which extends along central axis 15 of the assembly. An expansion segment 20 surrounds and is backed up by the bolt. In the embodiment of FIGS. 1 and 2 the expansion segment is integral with the bolt and is formed as an external surface thereon. It includes a tapered outer surface 21 which enlarges as it extends toward the head of the bolt.

A sleeve 25 is formed with an outer thread 26 which is so proportioned as to engage with a thread 27 in workpiece 28. An internal passage 29 extends axially from end to end of the sleeve. At least a portion of this passage includes an inner tapered surface 30. Preferably although not necessarily, the surface is tapered from end to end. If desired it may be tapered over only part of its length.

A notch 31 in the upper end of the sleeve forms torque tool engaging means.

There is also shown in FIG. 1 a tool 35 which includes a body 36, a handle 37, a bore 38 and a tang 39 adapted to fit into notch 31.

The presently preferred embodiment of the invention is shown in FIGS. 3 and 4. This stud assembly 40 includes a stud bolt 41 having a head 42, an external thread 43, a cylindrical shank 44, which assembly has a central axis 45. In this embodiment an expansion segment 50 is formed as an external ring having a cylindrical inner passage 51 which closely fits the cylindrical shank so that the expansion segment is slidable along the shank. An external tapered surface 52 is formed on the outside of the expansion segment. The expansion segment surrounds and is backed up by the stud bolt.

A sleeve 55 includes an external thread 56 so proportioned and arranged as to engage in a thread 57 in workpiece 58. It includes an internal passage 59 which extends from end to end, and which is tapered so as to receive and make an interference fit with the tapered surface 52 on the expansion segment. Head 42 overhangs the lower end of the sleeve so as to limit the travel of the bolt relative to the sleeve and also to limit the travel of the expansion segment. Notches 60 which form torque tool engaging means are formed in the upper end of the sleeve so as to receive a tool such as tool 35. The device of FIG. 3 is assembled in a particular manner so as to reduce the problems of warehouse stocking of the device. The sleeve and the expansion segment are placed over the shank before thread 56 is rolled on. After the thread is rolled, its crest diameter will be greater than the inner diameter of the expansion segment so that the expansion segment cannot slide off the bolt. The expansion segment keeps the sleeve on the bolt. The two slidable parts are therefore held to the bolt by the thread and the head.

It will be noted that in both embodiments the outer diameters of the two tapered surfaces are such that they will interfere with each other when they are pulled together, thereby serving to expand the sleeve into more intimate contact with the wall of the hole in the workpiece. In both embodiments the head overhangs the sleeve so as to limit the axial travel of the bolt relative to the sleeve and also to limit the travel of the expansion segment so as not to crack the workpiece.

The installation of the devices should be evident from the foregoing. In FIG. 1 while the stud bolt fits loosely in the sleeve, the sleeve is threaded into the hole by using tool 35. Thereafter using any appropriate pulling device such as one which engages the threads of the stud bolt and bears against the top of either the workpiece or the sleeve, the stud bolt is pulled up to the position shown in the middle of FIG. 1. This expands the sleeve into a tight fit with the wall of the hole. The abutment of the head and the sleeve limits the travel of the expansion segment and prevents excessive expansion that could cause cracking of the workpiece. The conical angle of the two tapered surfaces lies within the cone of friction so that the bolt is tightly retained. To remove the stud assembly the bolt is hammered or otherwise forced down as shown in the right hand portion of FIG. 1. Then with the bolt projecting into the bore of the tool the tang is placed in engagement with the notch or notches and the sleeve is backed out.

The installation and removal of the device of FIGS. 3 and 4 are essentially the same as those of FIGS. 1 and 2, except that after the sleeve is threaded into the workpiece, instead of pulling the stud up into the sleeve, the expansion segment is forced down between them thereby achieving the same tight fit and firm clamping onto the shank of the bolt. The head limits the travel of the expansion segment relative to the sleeve.

This invention thereby provides a simple and reliable stud assembly, which is easily installed and removed, and which in at least one of its embodiments is a self-retaining assembly that simplifies the problems of stocking parts.

This invention is not to be limited by the embodiments shown in the drawings and described in the description which are given by way of example and not of limitation but only in accordance with the scope of the appended claims.

I claim:

1. A stud assembly for installation in a threaded hole in a workpiece, comprising: an externally threaded tubular sleeve having an internal passage from end to end with a smooth tapered inner wall extending for at least a portion of the length thereof, the external threads being adapted to engage the threads in the hole in the workpiece, the sleeve being made of solid material, but being radially expansible by force exerted against said tapered inner wall; a stud bolt having a circular cylindrical shank; a head adjacent one end of the shank, and a thread spaced from said head, an expansion segment surrounding the bolt and backed thereby, said expansion segment comprising a ring with a circular inner passage slidably fitted on the shank and bearing a tapered outer wall having some portions which have larger lateral dimensions than some of those on the said inner wall, said tapered walls being tapered in the same direction and being so proportioned as to interfere with each other when axially shifted toward each other, whereby the sleeve is expanded into the wall of the threaded hole and the stud projects beyond the workpiece, the head overhanging the sleeve so as to limit travel of the expansion segment, the major diameter of the thread on the stud bolt being greater than the diameter of the passage in the expansion segment, the sleeve having been placed on the shank, the expansion segment having next been placed on the shank, both prior to formation of the thread on the stud bolt, and the thread then having been formed with its greater diameter, thereby to hold the assembly together.

2. A stud assembly according to claim 1 in which torque-tool engaging means is formed on the end of the sleeve facing the bolt thread.

References Cited

UNITED STATES PATENTS

| | | | |
|---|---|---|---|
| 445,332 | 1/1891 | Phillips | 85—73 |
| 577,737 | 2/1897 | Flaherty | 85—83 |
| 626,040 | 5/1899 | Rowlands | 85—73 |
| 1,013,222 | 1/1912 | Ruecking | 85—83 |
| 2,139,167 | 12/1938 | Marshall | 85—74 |
| 2,403,810 | 7/1946 | Lord | 151—19 |
| 2,408,559 | 10/1946 | Keating | 85—77 |
| 3,163,196 | 12/1964 | Hanneman | 151—37 |
| 3,332,463 | 7/1967 | Seckerson et al. | 151—19 |

FOREIGN PATENTS

| | | |
|---|---|---|
| 14,860 | 7/1929 | Australia. |
| 137,806 | 9/1920 | Great Britain. |

MARION PARSONS, JR., *Primary Examiner.*